(12) United States Patent
Lee et al.

(10) Patent No.: US 8,326,020 B2
(45) Date of Patent: Dec. 4, 2012

(54) STRUCTURAL LIGHT BASED DEPTH IMAGING METHOD AND SYSTEM USING SIGNAL SEPARATION CODING, AND ERROR CORRECTION THEREOF

(75) Inventors: Suk-han Lee, Yongin-si (KR); Jong-moo Choi, Seoul (KR); Dae-sik Kim, Seoul (KR); Seung-sub Oh, Suwon-si (KR)

(73) Assignee: Sungkyunkwan University Foundation

( * ) Notice: Subject to any disclaimer, the term of this patent is extended or adjusted under 35 U.S.C. 154(b) by 944 days.

(21) Appl. No.: 11/729,903

(22) Filed: Mar. 29, 2007

(65) Prior Publication Data

US 2008/0205748 A1 Aug. 28, 2008

(30) Foreign Application Priority Data

Feb. 28, 2007 (KR) .......................... 10-2007-0020080
Mar. 19, 2007 (KR) .......................... 10-2007-0026811

(51) Int. Cl.
*G06K 9/00* (2006.01)
*G01B 11/30* (2006.01)
(52) U.S. Cl. ........................... 382/154; 356/603; 356/604
(58) Field of Classification Search ................... 382/154; 356/603, 604, 605
See application file for complete search history.

(56) References Cited

U.S. PATENT DOCUMENTS

| | | | | |
|---|---|---|---|---|
| 2004/0005092 A1* | 1/2004 | Tomasi | ........................ | 382/154 |
| 2008/0279446 A1* | 11/2008 | Hassebrook et al. | ......... | 382/154 |
| 2009/0097039 A1* | 4/2009 | Kawasaki et al. | ............ | 356/603 |

FOREIGN PATENT DOCUMENTS

KR 100588296 2/2006
WO WO 2006120759 A1 * 11/2006

OTHER PUBLICATIONS

Lee et al., "Signal Separation Coding for Robust Depth Imaging Based on Structured Light", IEEE International Conference on Robotics and Automation, vol. 4, Apr. 2005, pp. 4430-4436.*
Seales et al., "Real-Time Depth Warping for 3-D Scene Reconstruction", in IEEE Aerospace Conference Proceedings, vol. 3, Mar. 1999.*

(Continued)

*Primary Examiner* — Anand Bhatnagar
*Assistant Examiner* — Soo Park
(74) *Attorney, Agent, or Firm* — Ballard Spahr LLP (57) ABSTRACT

Provided is a structural light based three-dimensional depth imaging method and system using signal separation coding and error correction thereof capable of detecting, removing and correcting corresponding errors between a projection apparatus and an image photographing apparatus caused by phenomena such as reflection on an object surface, blurring by a focus, and so on, using geometrical constraints between the projection apparatus and the image photographing apparatus. Here, the projection apparatus projects light, and the image photographing apparatus obtains the light. The depth imaging method includes projecting light from a projection apparatus, obtaining the light using an image photographing apparatus, and measuring a distance or a three-dimensional depth image. Therefore, it is possible to provide a structural light based three-dimensional depth imaging method and system using geometrical conditions capable of precisely obtaining three-dimensional depth information of target environment.

7 Claims, 11 Drawing Sheets

OTHER PUBLICATIONS

Jung et al., "A Framework for Constructing Real-time Immersive Environment for Training Physical Activities", Journal of Multimedia vol. 1, No. 7, Nov. 2006, pp. 9-17.*

Griesser, A. et al., "Automatic Interactive Calibration of Multi-Projector-Camera Systems," CVPRW '06, vol., no., pp. 8, Jun. 17-22, 2006.*

Chang, N. "Creating Interactive 3-D Media with Projector-Camera Systems", SPIE VCIPC, San Jose, CA, vol. 5308, pp. 850-861, Jan. 20-22, 2004.*

Sadlo et al., "A practical structured light acquisition system for point-based geometry and texture," Proceedings of the Eurographics Symposium on POint-based Graphics 2005.*

* cited by examiner

In- Discontinuity

STRUCTURAL LIGHT BASED DEPTH IMAGING METHOD AND SYSTEM USING SIGNAL SEPARATION CODING, AND ERROR CORRECTION THEREOF

CROSS-REFERENCE TO RELATED APPLICATION

This application claims the benefit of Korean Patent Applications No. 10-2007-0020080, filed on Feb. 28, 2007, and No. 10-2007-0026811, filed on Mar. 19, 2007, which are fully incorporated by reference in their entireties.

BACKGROUND OF THE INVENTION

1. Field of the invention

The present invention relates to a three-dimensional depth imaging method and system, and more particularly, to a structural light based three-dimensional depth imaging method and system using signal separation coding capable of detecting, removing and correcting corresponding errors between a projection apparatus and an imaging apparatus caused by phenomena such as reflections on an object surface, blurring by a focus, and so on, using geometrical constraints between the projection apparatus and the imaging apparatus. Here, the projection apparatus projects light and the imaging apparatus obtains the light.

2. Description of the Prior Art

Generally, a three-dimensional depth imaging method using structural light is widely used in computer vision, three-dimensional measurement, quality inspection, reverse engineering, robotics, and so on, because the method is appropriate to sense three-dimensional environment. A basic theory of the depth imaging method using structural light as an active stereo technique includes radiating light onto an object using projection means such as a projector, photographing the object, on which the light is radiated, using image receiving means such as a camera, observing a level of distortion of the light by the object, and calculating a distance to the object to obtain a depth image.

Figure 1:
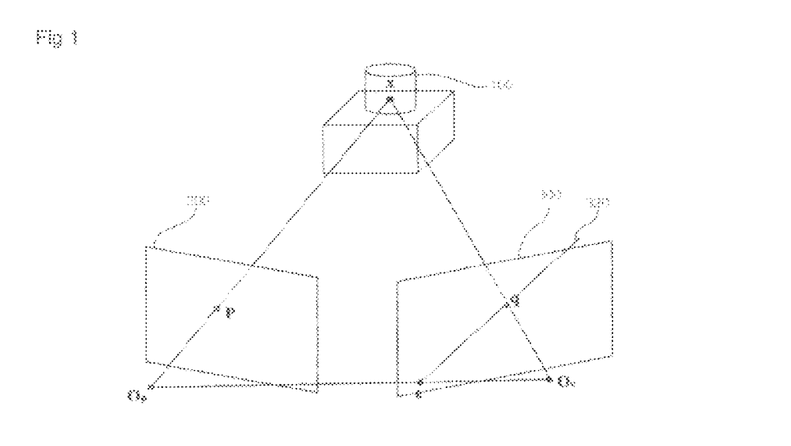
FIG. 1 is a schematic view illustrating a three-dimensional depth imaging method using structural light.

FIG. 1 is a schematic view for explaining a theory of a structural light based three-dimensional depth imaging system. As shown in FIG. 1, in order to measure a three-dimensional position of point x of an object 100, the point x is determined as an intersection of a straight line connecting an origin point Op of projection means with point p on a retinal plane 200 of the projection means and a straight line connecting an origin point Oc of image receiving means with point q on a retinal plane 300 of the image receiving means. Therefore, when correction of the projector and the camera is performed, it is possible to obtain the depth image by calculating coordinates of the point x as a pair of addresses of each retinal plane of the points p and q. That is, a major point of the depth imaging method as the stereo technique is to determine a pixel corresponding point between the received image and the projected image. When the corresponding point is determined, it is possible to readily calculate the depth using a simple geometrical method.

In order to increase precision of depth imaging, a light pattern projected from the projection means is coded on a pixel array in a spatial and temporal manner such that a pixel corresponding point of the projection means is solely determined in the image receiving means.

Such a structural light sensing method may be classified into three methods, i.e., a spatial coding method of calculating an address of a code using a sheet of pattern through the relationship with an adjacent code, a temporal coding method of calculating an address using a plurality of sheet patterns through a plurality of code information existing on the same position, and a hybrid coding method using the spatial coding method and the temporal coding method. Hereinafter, the temporal coding method will be described, except the spatial coding method and the hybrid coding method, which are disadvantageous to obtain three-dimensional information in complex environment.

The temporal coding method may be classified into a binary code method, a gray code method, a hierarchical orthogonal code (HOC) method, or the like.

The binary code method is a method of finding a code index using a binary code consisting of 1 and 0, which has an advantage capable of obtaining a precise value using a small number of patterns. However, the code index may be readily affected by adjacent pixels.

The gray code method is a method capable of minimizing affection of the adjacent pixels and obtaining a more precise value by changing the arrangement of a binary code. However, it is impossible for the code index to correct mixing of signals sent from a far place.

The HOC is a code in which the entire codes are divided into several hierarchies and codes in the hierarchies are arranged to have perpendicularity. Using the code, it is possible to find the mixing of the signals in each hierarchy. However, since the HOC is sensitive to effect of the adjacent pixels, similarly to the binary code, a modified HOC (MHOC), into which characteristics of the gray code are engrafted, has been developed. Since the MHOC can readily find the signal mixing, it is possible to minimize errors using the MHOC.

Since the structural light system is a system of projecting light to obtain three-dimensional information, distortion of light may be a major cause of the error. When reflection, focus error, interference of external light, interface, and temporal code are used, motion of the object (when the temporal code is used) during projection of the pattern may also become a factor of the error. When the object is measured through projection and obtaining of the pattern in the static environment, in which the object is not moved, it can be understood that the error is caused by two factors.

One factor is a case that light is scattered at a surface of the object to affect adjacent pixels due to excessive exposure of a camera, and light is out-focused to make the light be burred to the adjacent pixels. The other factor is a case that the error is generated by a far pixel (address) due to reflection, external light, signal mixing of interface.

Spatially scattered patterns may cause dispersion of light due to various reasons, which may be generated due to out-focusing of the camera or projector, or dispersion of the light at the object surface.

Figure 2A:
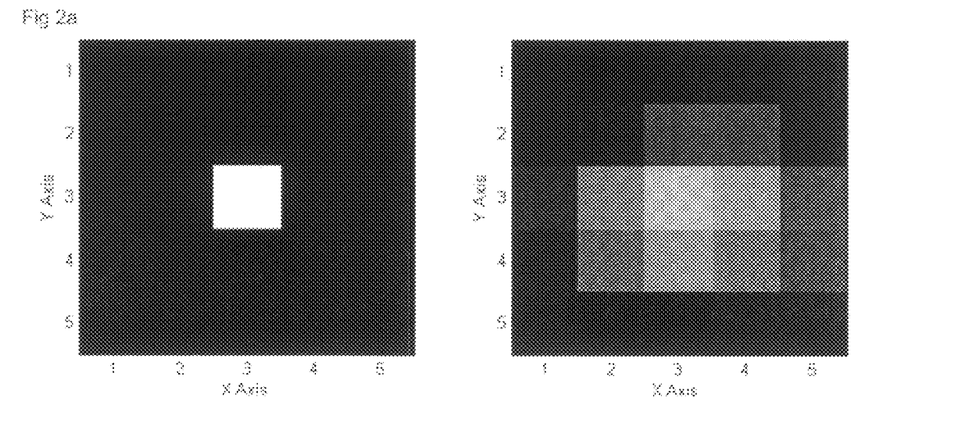
FIGS. 2A and 2B are views illustrating examples in which light is spread out on a surface of an object.
Figure 2B:
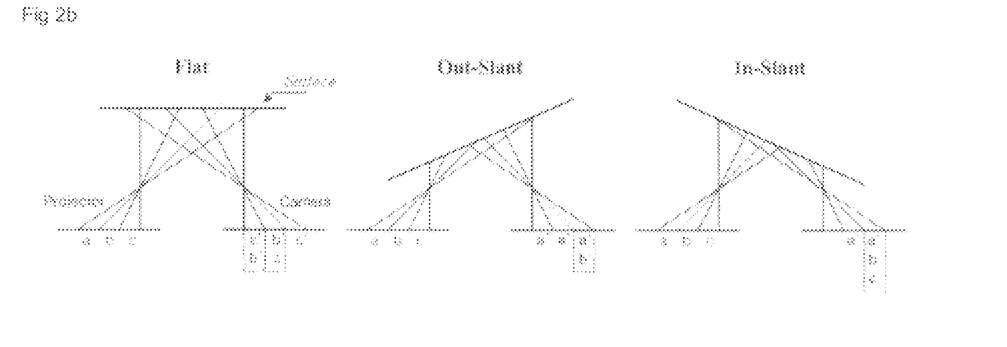

FIG. 2A shows an example of the above phenomena, and one point projected from the projector affects adjacent pixels as well as one point of the camera. FIG. 2B shows mixing of signals, which may be generated since regions affected by pixels of the camera and projector are different from each other. The signal mixing is generated due to geometrical affection of the object, the camera and the projector. In order to minimize the error due to the adjacent pixels, a gray code for making a code similar to the adjacent pixels may be used.

The errors generated due to reflection, affection of external factors, and mixing of signals cause a large pixel-wise error. Therefore, to solve these problems is a major task of the current structural light system.

Figure 3A:
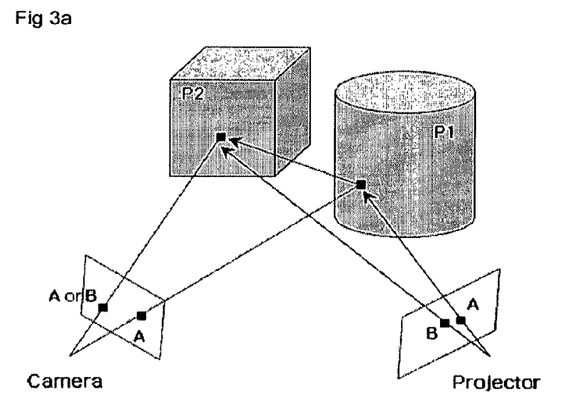
FIGS. 3A and 3B are views illustrating examples of an error due to reflection.
Figure 3B:
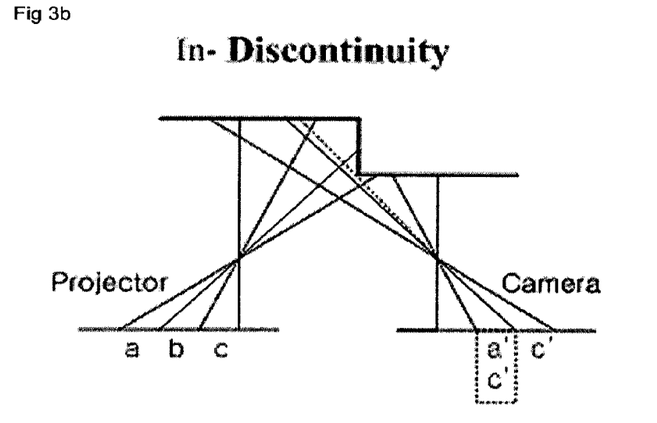

FIG. 3A shows an example of an error due to reflection. Light projected from a code A is reflected from point P1 to be transmitted to point P2. However, light projected from a code B is previously positioned at the point P2. In this case, two signals of the codes A and B are mixed at the camera pixel. Since an error due to the interface and the external factor also affects similarly to the error due to the reflection, intrusion of external light during projection and reception of the pattern makes it difficult to determine whether the light is pattern light or not. FIG. 3B shows mixing of signals generated at the interface, and it will be appreciated that signals a and c are mixed at a pixel of a charge coupled device (CCD).

Previous researches have made efforts to change only a code in order to control a factor of the error. However, a research for basically solving the problems has not been performed.

Therefore, in order to precisely and stably obtain three-dimensional image information, a novel approach is still required.

SUMMARY OF THE INVENTION

An object of the present invention is to provide a structural light based tree-dimensional depth imaging method and system using signal separation coding and error correction capable of obtaining precise three-dimensional depth information of a target environment by solving a problem in which precise three-dimensional recovery is impossible due to errors caused by reflection from an object surface formed of various materials and a focus of optical equipment in actual environment, regardless of characteristics such as noise of a system, and a material and reflectivity of an object surface in conventional structural light based three-dimensional recovery.

Another object of the present invention is to provide a structural light based three-dimensional depth imaging method and system using signal separation coding and error correction capable of finding distorted three-dimensional information using geometrical conditions.

Still another object of the present invention is to provide a structural light based three-dimensional depth imaging method and system using signal separation coding capable of correcting distorted information using geometrical conditions.

An aspect of the invention provides a depth imaging method including projecting light from a projection apparatus, obtaining the light using an image photographing apparatus, and measuring a distance or a three-dimensional depth image, characterized in that the method comprises detecting, removing or correcting an error of a corresponding point between the projection apparatus and the image photographing apparatus caused by a phenomenon including reflection and blur using geometrical constraints between the projection apparatus and the image photographing apparatus.

Another aspect of the invention provides a depth imaging system comprising projection apparatus for radiating light onto an object to be measured, image photographing apparatus for photographing the light radiated from the projection means, and processing means for measuring a three-dimensional depth image of the object wherein the processing means detects, removes or corrects an error of a corresponding point between a projection apparatus and an image photographing apparatus caused by a phenomenon including reflection and blur using geometrical constraints between the projection apparatus and the image photographing apparatus.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings.

The present invention provides a two-dimensional temporal code and multi-camera based depth imaging method in order to correct an error generated a structural light system.

[Two-Dimensional Code]

A two-dimensional temporal code means a method of encoding the entire space into a plurality of images. Since several conventional methods of encoding the entire space using a single dimensional code cannot use an epipolar geometry, it is impossible to determine existence of an error caused by reflection of an object surface. However, using a two-dimensional code, it is possible to detect and correct an error using epipolar constraints. Addresses, which are incorrectly estimated due to the reflection, may produce a three-dimensional value, not existing on an object surface or in a region hidden by another object, i.e., a shadow region.

Figure 4:
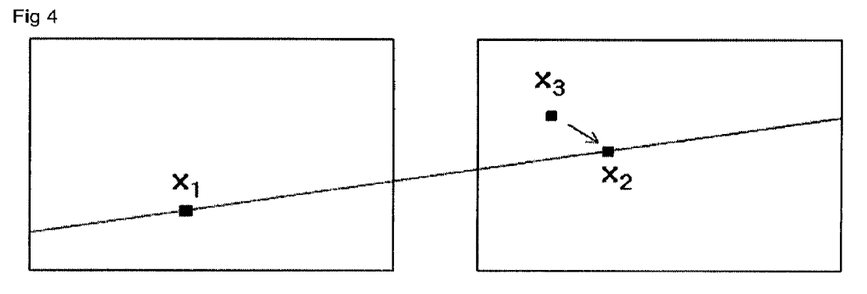
FIG. 4 is a view illustrating a value reflected and entered from outside an epipolar line.

As shown in FIG. 4, values reflected and entered from outside an epipolar line corresponding to a single point can be detected using the relationship between a fundamental matrix and corresponding points. That is, it is possible to detect using a formula $x_j^T F x_i = 0$.

Figure 5:
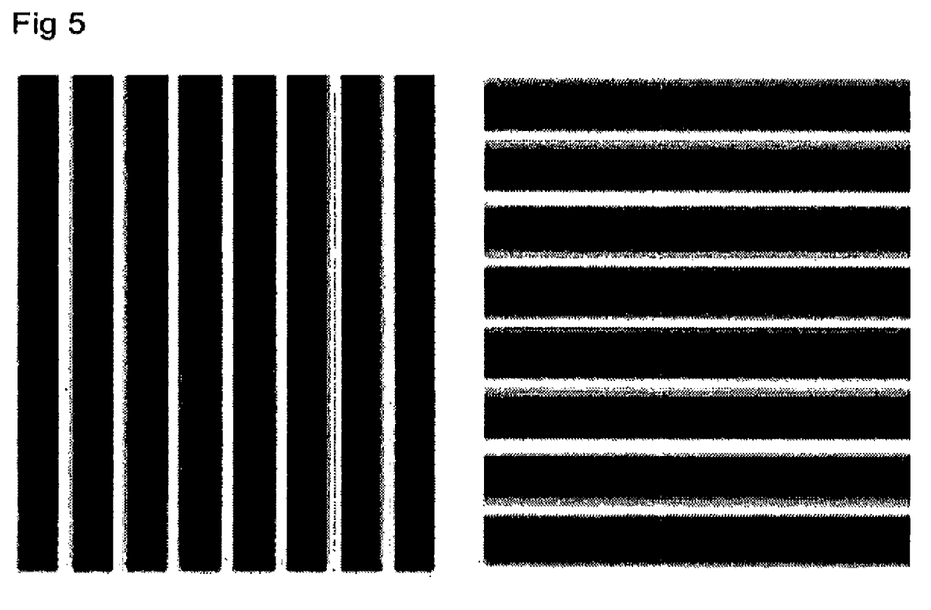
FIG. 5 is a view illustrating a method of sequentially projecting patterns in lateral and vertical directions.
Figure 6:
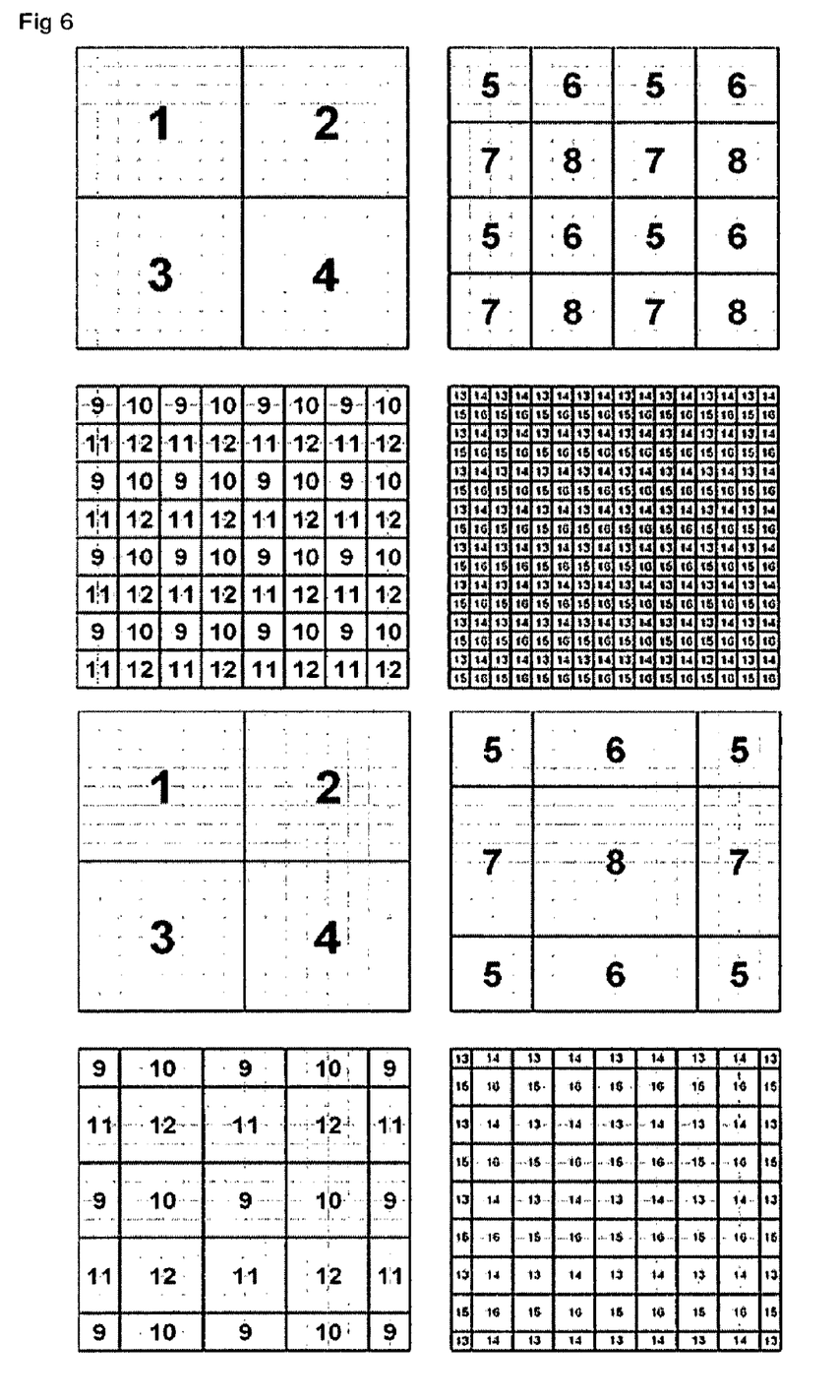
FIG. 6 is a view illustrating a method of projecting a two-dimensional spatial code.

The present invention provides a method of using a two-dimensional code as a method of sequentially projecting patterns of lateral and vertical directions as shown in FIG. 5, and a method of projecting a two-dimensional code as shown in FIG. 6.

In addition, it is possible to increase precision of a three-dimensional depth image by encoding a two-dimensional temporal code using properties of a gray code. As a result, it is possible to detect and correct an error, which cannot find using a conventional single dimensional code. Further, it is possible to provide a clearer three-dimensional depth image.

[Multi-Camera Structural Light System]

Though using the epipolar constraints, the structural light system using a single camera and a single projector cannot solve the above various problems.

For this reason, the present invention provides a dual camera structural light system. Of course, a conventional structural light system including two cameras and a single projector has been proposed to obtain three-dimensional information. However, the system is no more than a method of readily obtaining a point corresponding to a stereo camera using pattern information. The method does not consider determining which code is selected when various code addresses are represented through incorrect decoding.

The present invention provides a system including two cameras and a single projector. Using the system geometrically, it is possible to effectively detect, correct, and recover an error in reflection environment.

Figure 7:
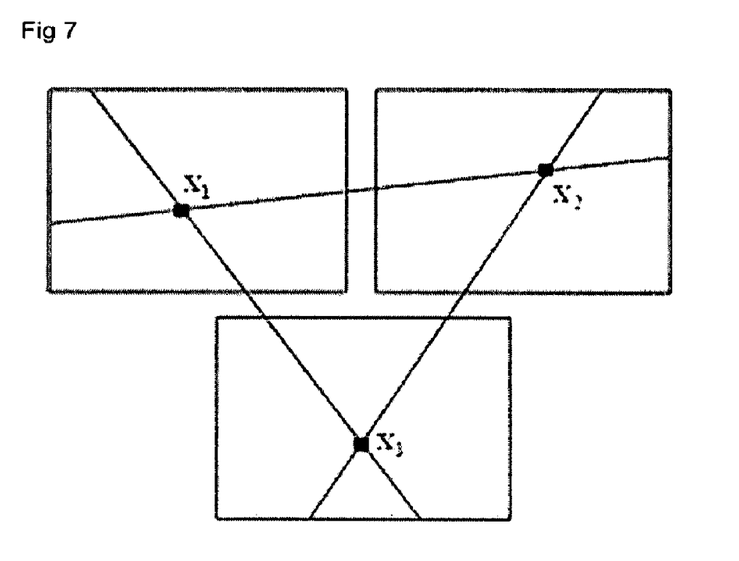
FIG. 7 is a view illustrating geometrical conditions formed between two cameras and a single projector.

FIG. 7 illustrates geometrical conditions generated between two cameras and a single projector, and $x_3=(F_{31}x_1)\times(F_{32}x_2)$ shows their relationship. Here, F represents a fundamental matrix, and $x_i$ means a corresponding point of each retinal plane. In the epipolar geometry, only one point corresponding to the two cameras and the projector exists in the space. Therefore, by adapting the geometrical constraints to structural light, it is possible to precisely and surely recover an object in reflective environment.

A precise corresponding point may be found using a trifocal tensor in addition to the epipolar conditions, or using the triangulation conditions in various visual points in which a distance value measured by triangulation in various visual points should be equal in the reference coordinate system.

[Image Rectification]

Figure 8:
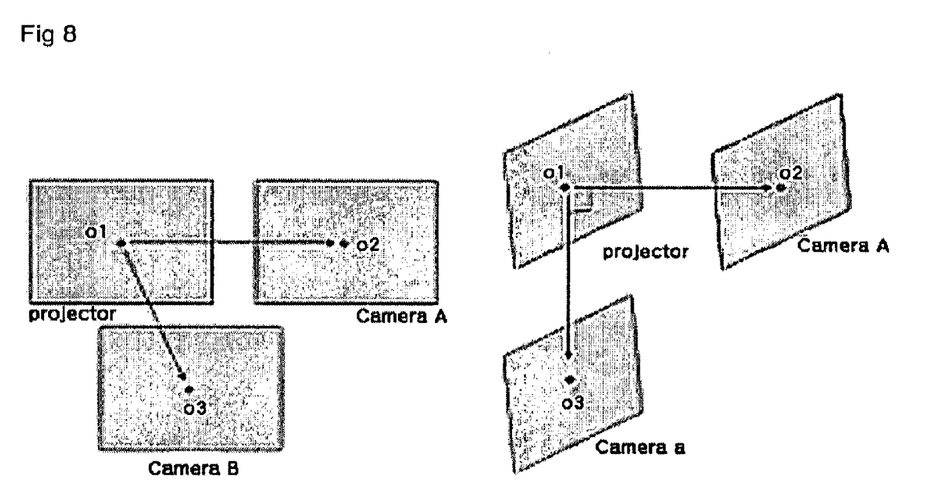
FIG. 8 is a view illustrating variation from a Euclidean space to an affine space.

Since the dual camera structural light system should find all epipolar line conditions of the two cameras and a single projector in order to find a coincidence point, it is time consuming operation in comparison with the conventional method. In order to solve the problem, trinocular rectification is required. The trinocular rectification functions to vertically position three image data disposed at different positions on a single plane. However, in the Euclidean space, it is impossible to position the respective planes perpendicular to each other. For this reason, trinocular rectification algorithm uses an affine coordinate system. FIG. 8 is a view illustrating variation from a Euclidean space to an affine space. At this time, an x-axis of the affine coordinate system represents a straight line from O1 to O2, and a y-axis represents a straight line from O1 to O3.

Figure 9A:
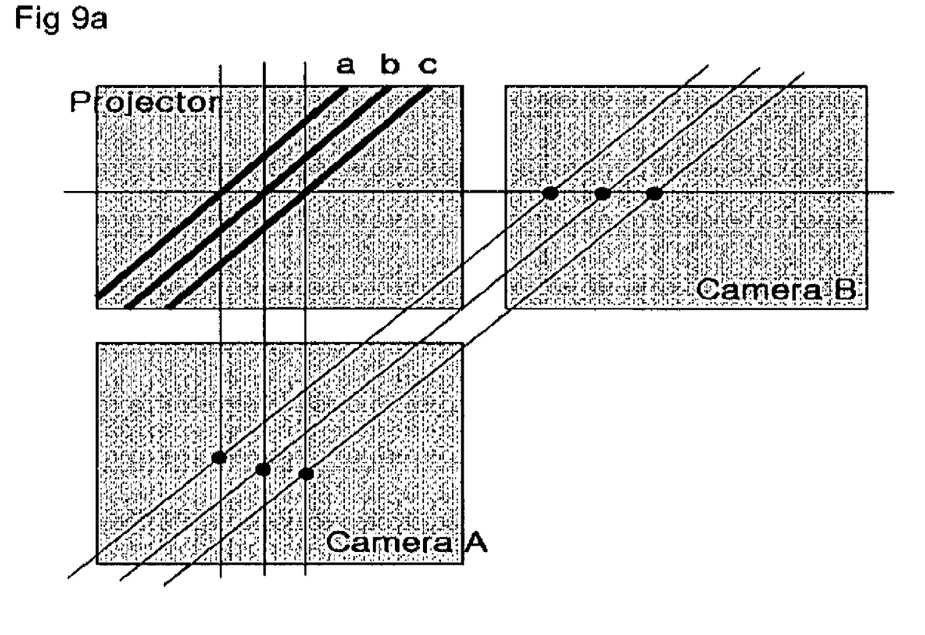
FIGS. 9A and 9B are views illustrating patterns after image rectification.
Figure 9B:
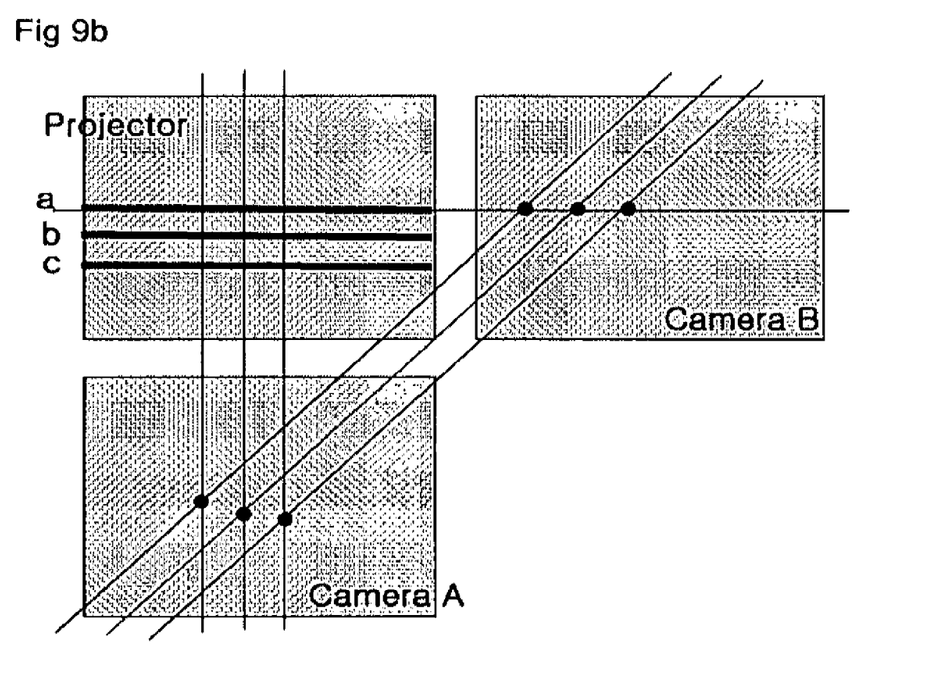

However, it is less advantageous to vertically position the three images in the dual camera structural light system. As shown in points a, b and c of FIG. 9A, the pattern after the image rectification is not parallel to the epipolar line. In this case, code address values a, b and c should be found in the respective epipolar lines. However, as shown in FIG. 9B, when pattern a is parallel to the epipolar line, it is only required to find code address a on the camera A and the camera B. Using the method, it is possible to remarkably reduce the time consuming for finding a corresponding point.

Figure 10:
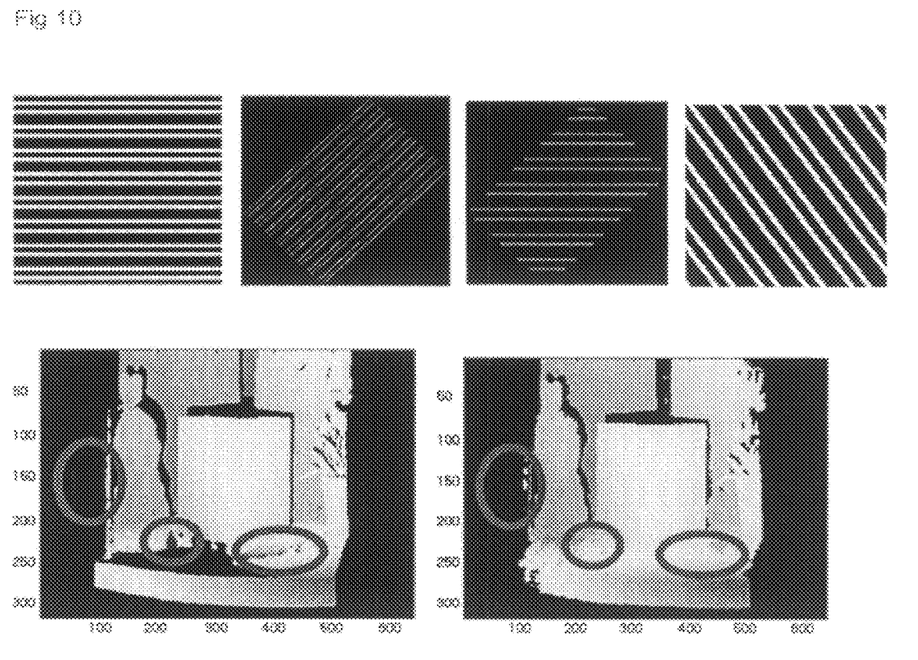
FIG. 10 is a view illustrating an example implemented by a three-dimensional depth imaging method in accordance with an exemplary embodiment of the present invention.
Figure 11:
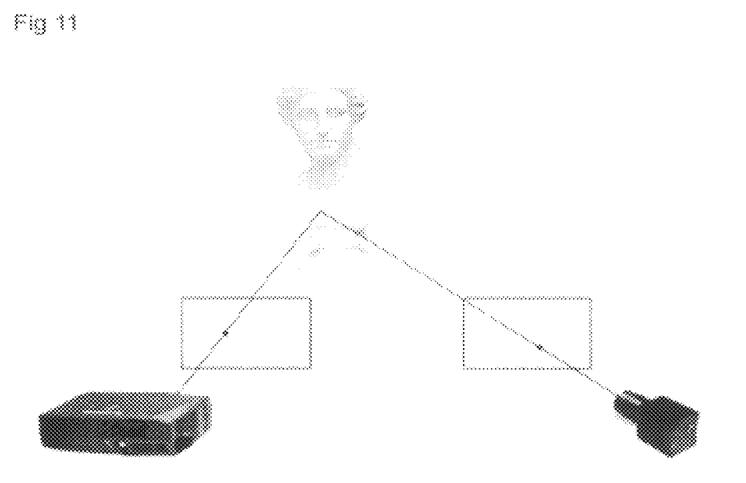
FIG. 11 is a view illustrating a method of measuring a three-dimensional depth using geometrical conditions (trigonometric measurement) of a projection apparatus (projector) and an image obtaining apparatus (camera)
Figure 12:
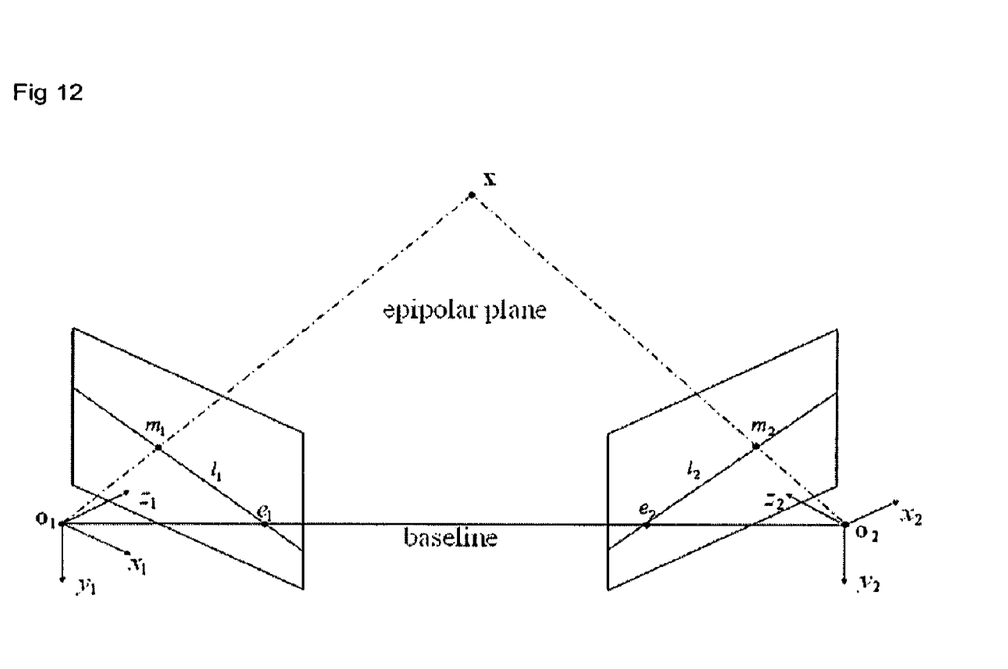
FIG. 12 is a view illustrating another method of FIG. 11.
Figure 13:
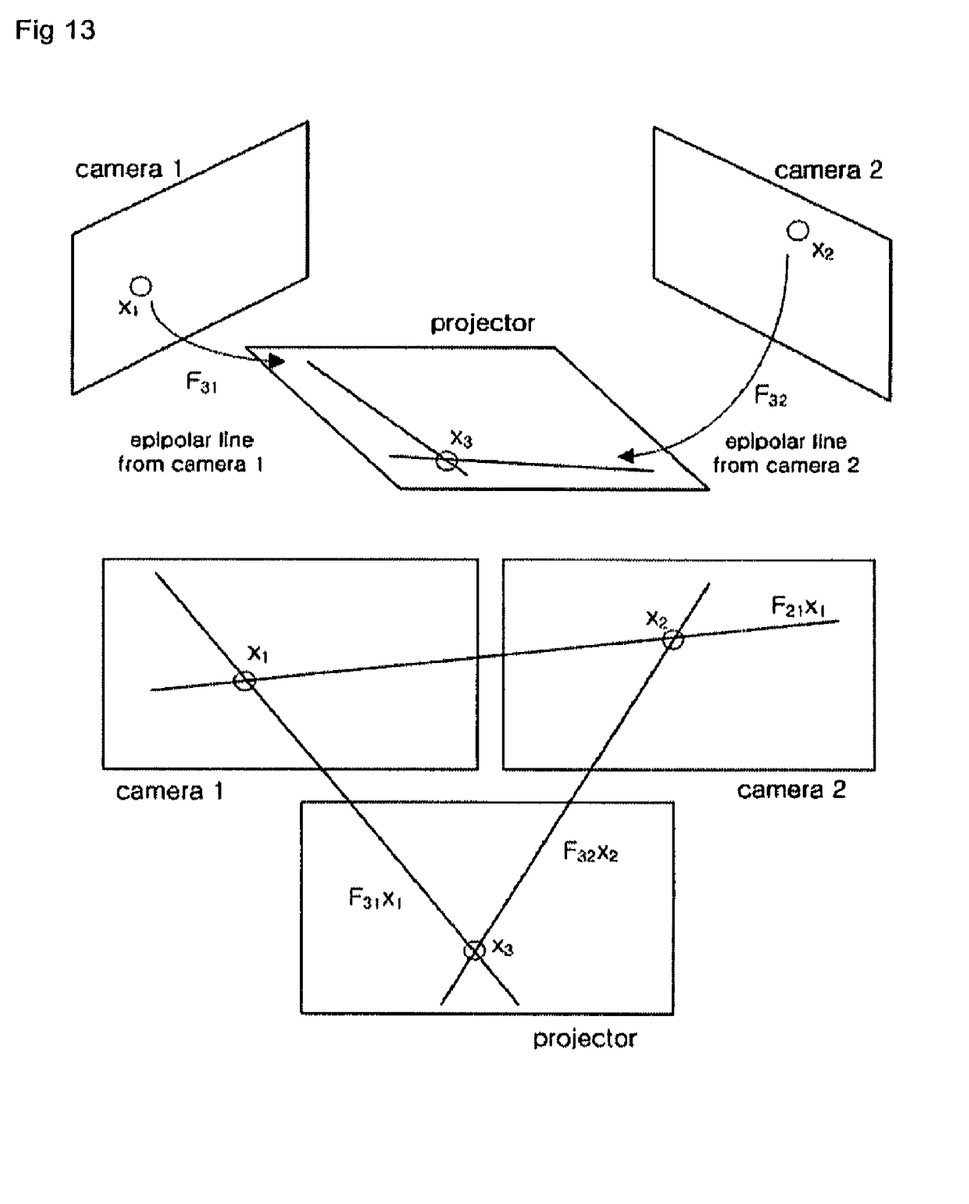
FIG. 13 is a geometric view illustrating an example of geometric views represented by a plurality of projection apparatuses and an image obtaining apparatus, for example, two cameras and a single projector.
Figure 14:
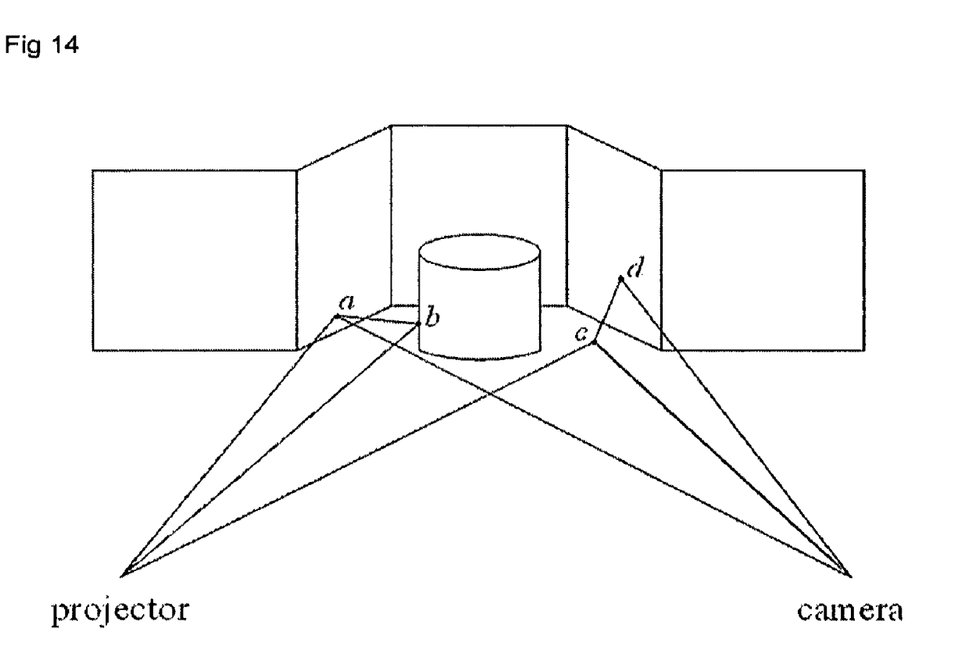
FIG. 14 is a view illustrating an example in which a camera incorrectly measures light due to reflection in actual environment, for example, when the light is reflected by point b to be transmitted to point a and the light is reflected by point c to be transmitted to point d, the camera incorrectly measures a three-dimensional value.

FIG. 10 is a view illustrating an example implemented by a three-dimensional depth imaging method in accordance with an exemplary embodiment of the present invention, FIG. 11 is a view illustrating a method of measuring a three-dimensional depth using geometrical conditions (trigonometric measurement) of a projection apparatus (projector) and an image obtaining apparatus (camera), FIG. 12 is a view illustrating another method of FIG. 11, FIG. 13 is a geometric view illustrating an example of geometric views represented by a plurality of projection apparatuses and an image obtaining apparatus, for example, two cameras and a single projector, and FIG. 14 is a view illustrating an example in which a camera incorrectly measures light due to reflection in actual environment, for example, when the light is reflected by point b to be transmitted to point a and the light is reflected by point c to be transmitted to point d, the camera incorrectly measures a three-dimensional value.

Figure 15:
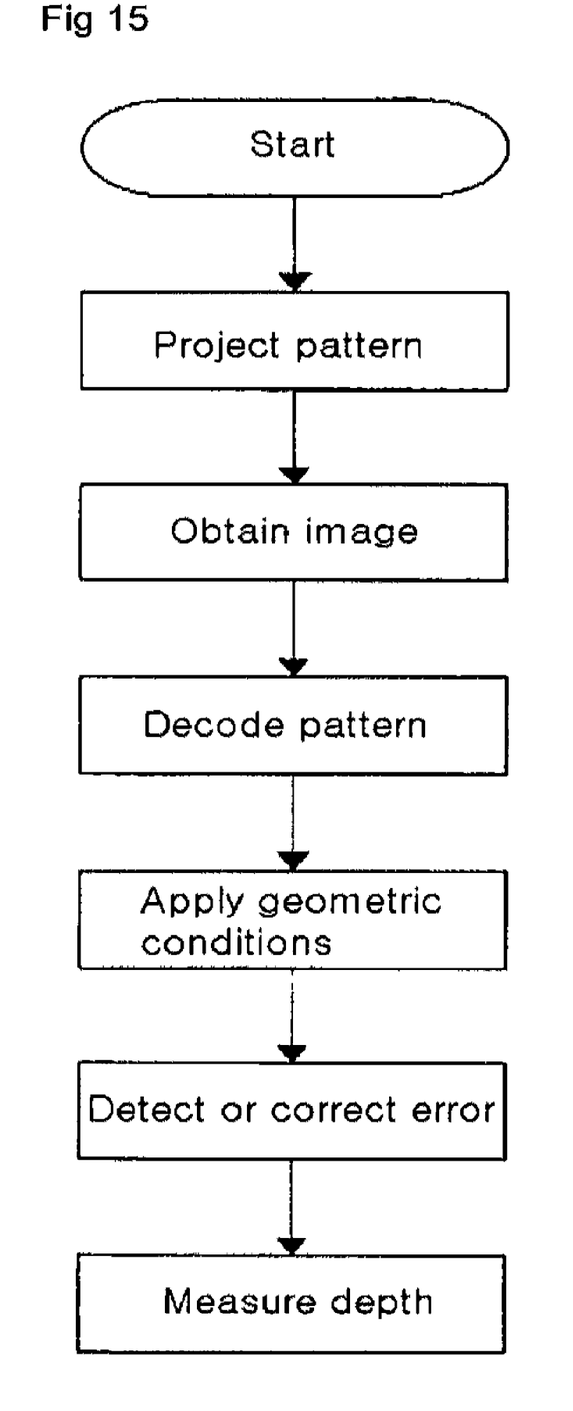
FIG. 15 is a flowchart illustrating a three-dimensional depth imaging method in accordance with the present invention.

FIG. 15 is a flowchart illustrating a three-dimensional depth imaging method in accordance with the present invention.

As can be seen from the foregoing, the present invention provides a structural light based three-dimensional depth imaging method and system using geometrical conditions capable of precisely obtaining three-dimensional depth information of target environment.

In addition, in the structural light based three-dimensional depth imaging method and system using geometrical conditions, it is possible to correct distorted information using geometrical conditions.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A method of measuring a three-dimensional depth by projecting a light pattern to a target object using one or more projection apparatus and obtaining the light pattern using one or more image photographing apparatus, the method comprising:

projecting different light patterns with the projection apparatus sequentially in time wherein the light patterns are rotated and projected such that a vertical axis or a horizontal axis of the light patterns to be projected is parallel to the epipolar line between the projecting apparatus and an image photographing apparatus corresponding to the light patterns to be projected;

detecting corresponding points of light on projecting surfaces of the projection apparatus which correspond to the points of the light introduced into one or more image photographing apparatus;

performing rectification on the images of the projecting apparatus and the image photographing apparatus such that axes of the light patterns projected from the projecting apparatus is horizontal or vertical; and detecting errors of the corresponding points between three of the apparatus by determining whether the corresponding points deviate from a horizontal line or a vertical line and checking the corresponding points.

2. The depth imaging method according to claim 1, wherein in detecting an error, epipolar conditions between the projection apparatus and the image photographing apparatus are used.

3. The depth imaging method according to claim 1, wherein the constraints include epipolar conditions among said three apparatus including at least one projection apparatus, trifocal tensor conditions, or triangulation conditions at multiple stages.

4. The method of measuring a three-dimensional depth as claimed in claim 1, wherein, in the detecting of the errors, the errors of the corresponding points are detected using geometrical constraints on the corresponding points between images of the rectified three the apparatus and the corresponding points are checked.

5. The method of measuring a three-dimensional depth as claimed in claim 1, wherein the light patterns use a region-based pattern or a code having two-dimensional coordinates.

6. A depth imaging system comprising:
at least one projection means for sequentially projecting differing light patterns in time onto an object to be measured, wherein the light patterns are rotated and projected such that a vertical axis or a horizontal axis of the light patterns to be projected is parallel to the epipolar line between the projecting apparatus and an image photographing apparatus corresponding to the light patterns to be projected;
at least one image photographing means for photographing the light patterns projected from the projection means;
a processing means for measuring a three-dimensional depth image of the object;
wherein the processing means performs rectification on the images of the projection means and the image photographing means such that the axes of the light patterns projected form the projecting means is horizontal or vertical, and checks points on projecting surfaces of the projection means which correspond to the point of the light introduced into the image photographing means and detects an error of the corresponding points between the projection means and the image photographing means by determining whether the corresponding points deviate from a horizontal line or a vertical line.

7. The depth imaging system according to claim 6, wherein the projection means is a projector, and the image photographing means is a camera.

* * * * *